United States Patent [19]

Boyer

[11] 4,225,279
[45] Sep. 30, 1980

[54] AIRPORT TOWING VEHICLE FOR HANDLING LARGE TRANSPORT AIRCRAFTS

[75] Inventor: Jean J. Boyer, Montchauvet, France

[73] Assignee: Societe Anonyme Secmafer, Bechelay Mantes la Jolie, France

[21] Appl. No.: 892,942

[22] Filed: Apr. 3, 1978

[30] Foreign Application Priority Data

Apr. 7, 1977 [FR] France ............................ 77 10558
Jul. 1, 1977 [FR] France ............................ 77 20284
Nov. 21, 1977 [FR] France ............................ 77 34938

[51] Int. Cl.² ............................................. B60P 29/00
[52] U.S. Cl. ..................................... 414/428; 414/430
[58] Field of Search ............... 214/330, 331, 332, 333, 214/334; 414/426, 428, 430, 434, 436, 437, 552, 699

[56] References Cited

U.S. PATENT DOCUMENTS

| 3,662,911 | 5/1972 | Harman | 214/334 |
| 3,749,266 | 7/1973 | Gordon | 214/334 |
| 3,905,501 | 9/1975 | Leroux | 414/699 |
| 3,927,775 | 12/1975 | Graupmann | 414/430 X |
| 3,946,886 | 3/1976 | Robinson | 214/334 |
| 4,036,384 | 7/1977 | Johnson | 214/334 |

FOREIGN PATENT DOCUMENTS

1028892  4/1958  Fed. Rep. of Germany ........... 214/334

Primary Examiner—Robert G. Sheridan
Attorney, Agent, or Firm—Darby & Darby

[57] ABSTRACT

The present invention relates to airport towing vehicles capable of handling large transport aircrafts. The vehicle has a movable chassis on which a platform for receiving the nose wheel unit of an aircraft is mounted. An access ramp, pivotally connected to an edge of the platform is engaged under the nose wheel unit of the aircraft to bring the nose wheel unit upwards onto the platform and a lifting device is supplied at controlled pressure to exert a lifting force on the access ramp which is a function of the load of the nose wheel unit taken over by the access ramp. Rollers on the upper surface of the access ramp reduce frictional resistance between the tires of the nose wheel unit and the upper surface of the access ramp.

12 Claims, 8 Drawing Figures

AIRPORT TOWING VEHICLE FOR HANDLING LARGE TRANSPORT AIRCRAFTS

The present invention relates to airport towing vehicles for handling large transport aircrafts. Due to the constant increase of tonnage of such aircrafts and to the fuel consumption as well as the low efficiency of their jet engines when taxiing on the ground, it has been attempted to effect such movements with towing vehicles.

According to the known technique, a coupling bar is usually employed for coupling the aircraft to the towing vehicle, one end of which bar is fixed to the rear coupling point of the towing vehicle, and the other end is attached through a coupling member, such as tongs or similar devices, to the aircraft nose wheel unit. This coupling system offers some disadvantages. In particular, the coupling and uncoupling maneuvers are operations which are long and complex and necessitate occasionally the removal of parts, this being incompatible with the trafic density on airports. Moreover the load to be towed is important and necessitates very heavy towing vehicles, but in spite of the weight of such vehicles and due to the high inertia of the aircrafts, the turning, starting and stopping operations are delicate, often leading to incidents. Various solutions for solving such problems have been proposed. Particularly, it has been proposed to shift the coupling point in the towing vehicle in the vicinity of the driving rear wheels for facilitating the turning operations and reducing the lateral components of the forces. There has also been proposed coupling bars which are automatically extended and retracted so as to decrease the time of the coupling and uncoupling operations, but none of the proposed solutions have proved entirely satisfactory.

The present invention aims at overcoming the hereabove mentioned disadvantages and provides a towing vehicle for handling heavy aircrafts, provided with a rear platform on which is loaded the aircraft nose wheel unit.

The known art for such type of towing vehicle is illustrated in U.S. Pat. No. 3,749,266. Said patent describes an aircraft towing vehicle with a central well closed by a gate that swings down to form a ramp and that is pushed under the nose wheel unit of the aircraft while the other wheels of the aircraft are locked. Power-operated jaws on the sides of the well clamp the nose wheel unit between them, and when the unit is a tandem unit, a power-operated ram bar at the inner end of the well protrudes inside said well and secures the unit between the ram bar and the closed gate. Said patent provides also the free end of the gate with anti-friction rollers which also reduce the friction when the free end of the gate engages the nose wheel unit of the aircraft to be towed. Studies and experiments carried out regarding the invention show that the towing vehicle of U.S. Pat. No. 3,749,266 is purely theoretical, that it would not be in a position to handle a large transport aircraft and that the proposed means would cause serious damage to the towed aircraft. On the one hand, the pushing force which is necessary for engaging the inclined ramp under the wheels of the nose unit of an aircraft is in fact very high since the wheel cannot turn before almost complete termination of the engagement due to its heavy load and the coefficients of friction of the tires on the cement of the runway and the metal of the ramp. On the other hand, the portion of the nose wheel unit which is transferred onto the ramp presses the edge of said ramp onto the ground and creates a friction resistance which is also in opposition with the engagement and finally all said forces which oppose the engagement create, due to the wedge effect, a vertical component unloading the nearest wheels. U.S. Pat. No. 3,749,266 claims that the hereabove difficulties are overcome by placing rollers under the front edge of the ramp, but said rollers on which will be transferred the load of the nose wheel unit will stamp the runway coating due to the high unit pressure and they will not be in a position to facilitate engagement of the tire onto the ramp since, being simultaneously in contact with the ground and the tire, the tangential forces which are applied thereto are in opposition. Moreover, the tyres are crushed and a single row of rollers the diameter of which is necessarily small would not avoid an important contact surface of the tyre with the ramp surface during engagement. The aforementioned patent proposes also to lock the nose wheel unit either between two side power-operated jaws or between a longitudinally moving front jaw and the closed gate of the well. The first proposal is obviously inapplicable due to the fragility of the nose unit members and the high clamping force which would have to be applied transversely for providing a sufficient longitudinal traction force. The two proposals cannot operate because they lead to making the aircraft nose wheel unit rigid with the towing vehicle, and this, in the turns, will create a torsional torque on the nose wheel unit strut since the steering of the nose unit is irreversible. The only possibility would be disconnecting the steering rods, but when the aircraft has to be brought down from the towing vehicle in an emergency case, it is then steerless and this causes damage to at least the nose wheel unit. Finally and due to the necessary length of the ramp, it is not possible to use the access ramp as a rear stop member for the nose wheel unit as it cannot be adapted behind the wheels.

The present invention provides a solution for the hereabove described problems and remedies the prohibitory disadvantages of the known art.

Its object is an airport towing vehicle for handling large transport aircrafts of the type comprising on its chassis a platform for receiving the nose wheel unit of the aircraft, extending as an inclined plane forming an access ramp, articulated on the free edge of said platform via a horizontal axis and connected to the towing vehicle frame through a lifting device such that the inclined plane in a lowered position can be engaged under the nose wheel unit of the aircraft which is stationary in order that said nose wheel unit moves upward onto said platform, and means formed by jaws coming in engagement in front and behind the wheels of the nose unit of the aircraft for locking sad aircraft onto said platform, characterized in that a horizontal turntable is rotatably mounted on the platform, the clamping jaws for the nose wheel unit being carried by said turntable.

This arrangement avoids having to make the aircraft nose wheel unit loose in order to allow it to follow the relative heading direction difference between towing vehicle and aircraft and avoids the transfer of torsional moments onto the front strut of the nose wheel unit.

The horizontal turntable which bears the nose wheel unit of the aircraft is mounted for free rotation on the platform through a ball bearing ring. The unit is oriented by the wheels of the nose unit being encased into the recess provided between the stop members and between the stop members themselves, and it has proved necessary in practice to reduce the slopes of the recess for limiting the acceleration and braking forces resulting from said slopes. The reduced slope reduces the automatic realignment effect when loading the nose wheel unit. Consequently, it is useful to provide a re-alignment device for the turntable. This re-alignment device may be formed by a motor the output pinion of which meshes with a toothed rim fixedly attached to the turntable, but such a device requires a drive servo-controlled by the instantaneous angular position of said turntable. It is therefore preferable to provide a re-alignment device of the type with an eccentric pivot coupled to a towing element such as a chain or a rod, or cooperating with a guiding cam. This device may be combined with a locking means for the turntable in re-alignment position, as said device may prove interesting in the case of large transport aircrafts having some of the wheels of their main landing gear controlled by the orientation of the nose wheel unit beyond a given turning angle, as regards their orientation.

According to an embodiment, the stop means which cooperate with the nose wheel unit comprise a front stop member rigid with the platform and fixed relative thereto, and a retractable rear stop element. Preferably, the rear stop element is retractable at least under the action of a tractive force which is superior to a calibrated force. For so doing, the rear stop element may be formed of a plate articulated about a horizontal axis and biased towards an upright position by a calibratable resilient device. The calibratable resilient device forms a safety device which frees the nose wheel unit when a force superior to a given force is applied to the stop means. Preferably, the rear stop means can retract only when the aircraft nose wheel unit longitudinal axis forms an angle which is inferior to a given angle relative to the towing vehicle longitudinal axis and is provided to this effect with a locking device. When the heading difference, that is the angle between the aircraft and the towing vehicle is higher than the given angle, the aircraft pilot can eliminate the action of the locking device by conveniently directing the nose wheel unit. This arrangement provides, as opposed to the conventional coupling arrangement with a rigid bar, an increased safety since the pilot can, by a simple action on his own brakes and eventually on the steering wheel, uncouple the aircraft from the towing vehicle.

According to a further characteristic of the present invention, the portion of the upper surface of the access ramp adjacent the free edge is provided with rollers protruding above its plane for facilitating engagement of the nose wheel unit onto said access ramp, more precisely for facilitating the engagement, by rolling under the tire which cannot move due to its bearing on the ground, of the front edge of the access ramp.

Preferably, and according to a further characteristic, the vertical axis of the horizontal plate is substantially right above the rear driving wheel axis. With such a characteristic, the nose wheel unit of the aircraft follows exactly the chosen path without side deviations relative thereto, and the tractive and braking forces which are brought back in the vicinity of the rear driving wheels of the towing vehicle have no influence on its steering, thereby facilitating and providing more safety for the handling operations.

As hereabove discussed, various problems arise from the engagement of the nose wheel unit of the aircraft onto the access ramp. Firstly, it is not possible to consider engaging an inclined plane under a highly loaded tire bearing on the ground due to the extremely high frictional force between the tire, blocked on the ground by its own frictional force, and the inclined plane surface, and this first problem is solved by the hereabove characteristic consisting in providing with rollers the edge portion of the upper surface of the ramp on which the tyre engages until it is no longer in contact with the ground.

A second problem arises from the friction of the lower surface of the end of the inclined plane on the runway ground during loading. The bearing surface of the ramp which is in contact with the ground assumes the shape of a shoe and supports during loading a progressively increasing part of the load of the nose wheel unit, and the frictional force applied by the ramp on the ground becomes very high while the towing vehicle is moving for loading the nose wheel unit which runs along the access ramp inclined plane. Moreover, and since the access ramp forms an inclined plane, a force is necessary for bringing the nose wheel unit upwards along said inclined plane, said force being proportional to the load and to the sine of the inclined plane slant angle. The total engagement force corresponding to the sum of said two forces is transmitted to the towing vehicle in the region of the articulation axis of the inclined plane and is decomposed into a horizontal component and a vertical component extending upwards, said vertical component being proportional to the sine of the slant angle of the inclined plane. In practice, said angle cannot be reduced below about 15° if the ramp is not to be made too long, and this gives a vertical component which is not negligible and unloads the rear wheels of the towing vehicle which, as a consequence, do not have any more a sufficient adherence and start skidding.

According to a further characteristic, an object of the invention is to solve this problem by providing a device which reduces the frictional force of the inclined plane end on the ground and which applies on the towing vehicle rear wheels an extra load which is a function of the engagement force.

According to this characteristic, the supply of the lifting device for the inclined plane which forms the access ramp is servo-controlled by a detector for the contact pressure between the lower surface of the access ramp and the ground. In practice, and the resistance to the engagement of the ramp under the nose wheel unit of the aircraft being a function of the contact pressure of the ramp on the ground, said contact detector is indirect and formed by the lower surface of the ramp itself, that is that the servo-control is provided by the engagement force exerted by the towing vehicle.

According to one embodiment and in the case of a hydraulic power transmission and a lifting device of the inclined plane formed by a hydraulic jack, the pump supplying the motors of the driving wheels is connected through a by-pass piping to the lifting hydraulic jack so that the lifting torque exerted by the jack is a function of the pressure prevailing in the supply circuit of the hydraulic motors, which is itself proportional to the resisting torque on the wheels.

With the hereabove mentioned means wherein the access ramp end bears on the ground through its lower face forming a sliding shoe on the runway ground, it is possible to reduce the portion of the nose wheel unit load which is directly transferred to the ground by said shoe. It might seem desirable to cancel the transfer of the nose wheel unit load to the ground through the shoe so as to suppress the portion of the engagement force corresponding to said frictional force. This would be theoretically possible by increasing the cross-section of the jacks or by increasing the lever arm ratio according to which said jack operates relative to the length of the ramp. However, the lifting force of the nose wheel unit provided by the ramp must be, until complete engagement of the nose wheel unit on the ramp, inferior to the portion of the nose wheel unit load transferred on the ramp.

For so doing, and according to a further characteristic, the connection between the supply circuit for the motors and the supply circuit for the jacks is provided through a calibrated valve such that the pressure in the lifting jacks is inferior to the supply pressure of the motors.

Moreover, it is necessary that the access ramp is not subjected to a quick variation of the supply pressure of the motors. While loading and as the aircraft moves upwards along the access ramp, the torque applied by the load of the nose wheel unit on the access ramp actually decreases. The result is that the frictional force of the ramp shoe on the ground decreases and even reaches zero when the ramps is lifted from the ground. Moreover, if the ramp is being lifted, the angle of the inclined plane decreases and therefore the force necessary for bringing the nose wheel unit upwards on the inclined plane decreases also. One is therefore in presence of a decrease of the resistance opposed to the towing vehicle and in consequence of the supply pressure of the motors. Therefore, there would be the risk of the ramp assuming an instable position as the jacks would be supplied with a variable pressure. Consequently and according to a further characteristic, the supply circuit of the ramp lifting jacks comprises a non-return valve and a hydropneumatic accumulator communicating with the jacks supply circuit downstream of said valve. The volume of the accumulator is chosen such as to obtain a reduction of the pressure which is a function of the lifting of the access ramp, causing a volume increase of the jacks chambers, so that the ramp be in a completely lifted position when it is subjected only to its own proper weight, and in a bearing position on the ground before the load of the nose wheel unit is in the vicinity of the access ramp end. The non-return valve is by-passed before initiating a loading operation previously to the engagement of the ramp under the nose wheel unit, and said valve therefore, in combination with the pressure accumulator, provides a dumping effect when the ramp is being lowered when the pilot applies the brakes to his aircraft when bringing it down from the towing vehicle, and also a friction reduction of the ramp on the ground while unloading. However, a blocking device for the ramp in its lowered position or a device setting the jacks circuit on the exhaust if the ramp tends to come upwards again has to be provided in order to avoid any damage to the aircraft due to the access ramp reverting abruptly to its lifted position.

As, while coming upwards on the access ramp, the bearing point of the nose wheel unit comes nearer to the articulation axis, whereas the ramp is subjected to a constant lifting torque, the lifting force exerted by the ramp on the nose wheel unit increases. When the lifting force increases, the load transferred to the ground by the ramp decreases, and thereby the frictional component of the engagement force exerted by the towing vehicle decreases. It is therefore thereby possible to increase the second component of the engagement force, that is the force necessary for the nose wheel unit to roll upwards on the inclined plane, and therefore the angle of the inclined plane, since said force is proportional to the angle sine. Moreover, the lifting force still increasing, it comes in excess at a certain moment of the load of the nose front wheel and the access ramp, subjected to a constant lifting torque, is lifted through an angle determined by the fact that from said moment the lifting torque decreases due to the fact that the jacks chamber volume increases with the input of oil from the accumulator. This lifting of the access ramp reduces the apparent slant angle of the inclined plane formed by the ramp. It is therefore possible to give to said portion of the access ramp a larger apparent slant angle (slope angle when the end of the ramp is bearing on the ground). It is obvious that said two factors add up and that such a possibility to increase the access ramp slope in the vicinity of its articulation provides, while preserving the same average slope which is determined by the two factors of the access ramp length and the platform height above the ground, a reduction of the access ramp slope in the vicinity of its end, that is a reduction of one of the two components of the engagement force required from the towing vehicle.

Consequently, and according to a characteristic of the invention, the slant angle of the access ramp bearing on the ground increases from its free end towards the articulation axis of the access ramp on the towing vehicle platform.

However, it is preferable from a safety point of view to set a limit to the slant angle such that, if for one reason or other, the access ramp would not move up during a loading operation or would brutally come down while unloading, the efforts applied on the nose wheel unit, proportional to the slant angle sine, would be limited. It is estimated that an angle of 20° corresponding to a rolling force of the nose unit on the inclined plane equal to a third of the nose unit load is the maximum desirable limit.

Further characteristics and advantages of the present invention will become apparent from the following description, with reference to the accompanying drawings wherein.

Figure 1:
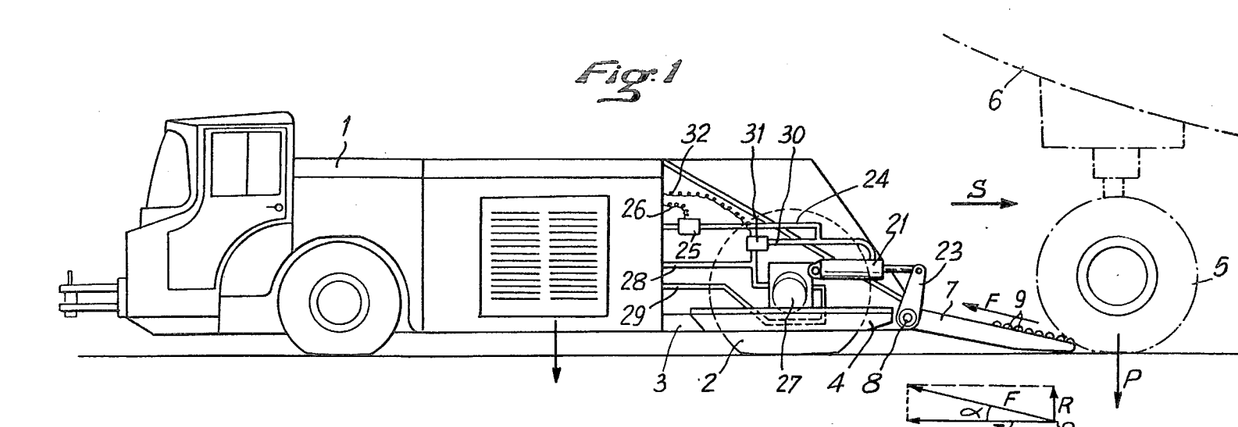
FIG. 1 is a schematic side elevation view of an airport towing vehicle for handling large transport aircrafts according to the present invention.
Figure 2:
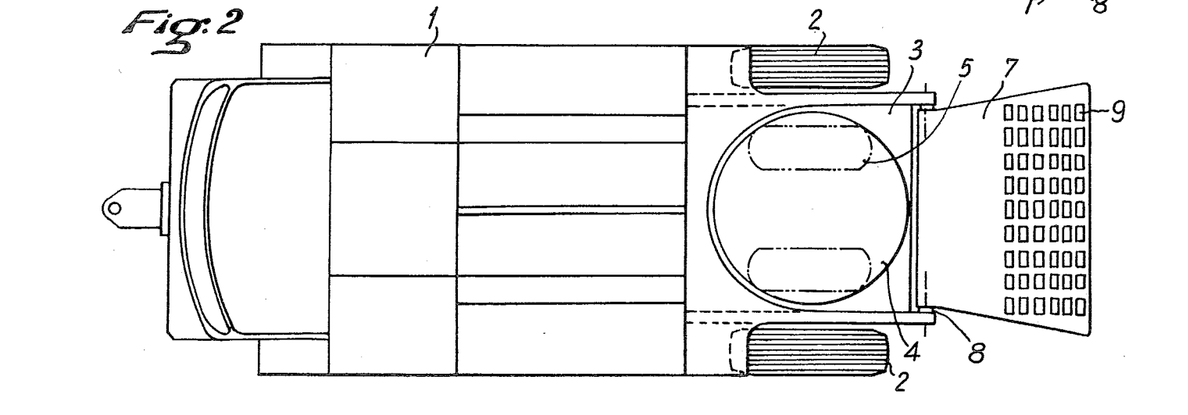
FIG. 2 is a plan view of the airport towing vehicle of FIG. 1.

Referring to the drawings, and more particularly to drawings 1 and 2, numeral 1 applies to the airport towing vehicle as a whole. The airport towing vehicle comprises, between the two rear driving wheels 2, a platform 3 on which is mounted a turntable 4 for supporting the nose wheel unit 5 of a large transport aircraft 6. Platform 3 is extending via an inclined plane forming an access ramp 7, said inclined plane being fixed to the platform 3 through a transverse axis 8. The inclined plane forming the access ramp 7 comprises at its rear end a plurality of small rollers 9 for facilitating the access of the nose wheel unit 5 of the aircraft onto said access ramp 7. As a matter of fact, at the beginning of the engagement, the tires of the nose wheel unit bear on the ground with a load P and cannot turn, and rollers 9 lift the nose wheel unit under which they roll until said unit is lifted from the ground and is free to roll on the access ramp plane. In order to raise the nose wheel unit 5 of the large transport aircraft on the supporting platform 4 and thereby carry out the taxiing operations on the ground, the airport towing vehicle 1 reverses into a position where the rear lower end of the access ramp comes in engagement under the wheels of the front unit 5 of the aircraft, with the longitudinal axis of the aircraft and the longitudinal axis of the towing vehicle being as much as possible coincident. The towing vehicle 1 goes on reversing in the direction of arrow S and the front wheel unit is brought in position on the supporting platform 4, the traction point of the aircraft being thereby transferred above the driving wheels 2, which facilitates the taxiing operations of the aircraft. The loading operation as such will be described in more detail hereafter.

Figure 3:
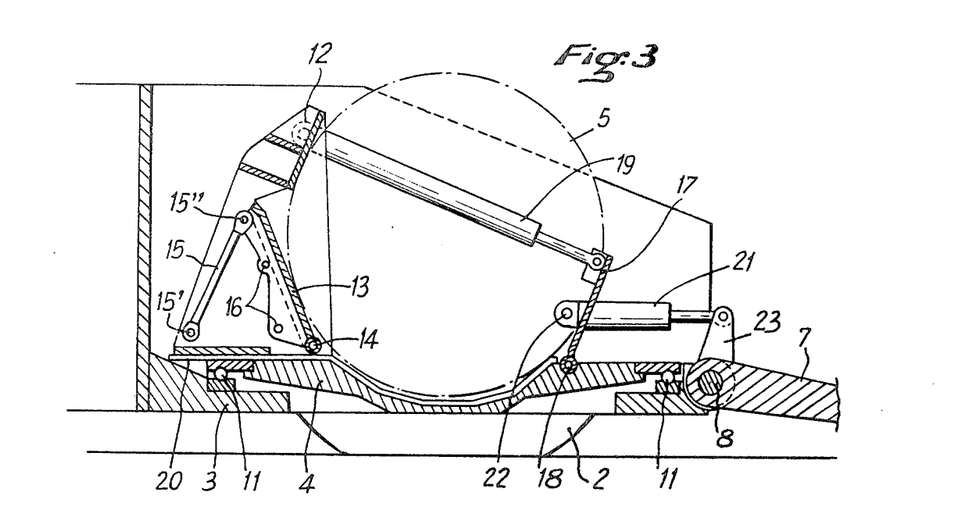
FIG. 3 is a longitudinal cross-sectional and side elevation view of one embodiment of the rear platform of the airport towing vehicle for handling large transport aircrafts according to the present invention.
Figure 4:
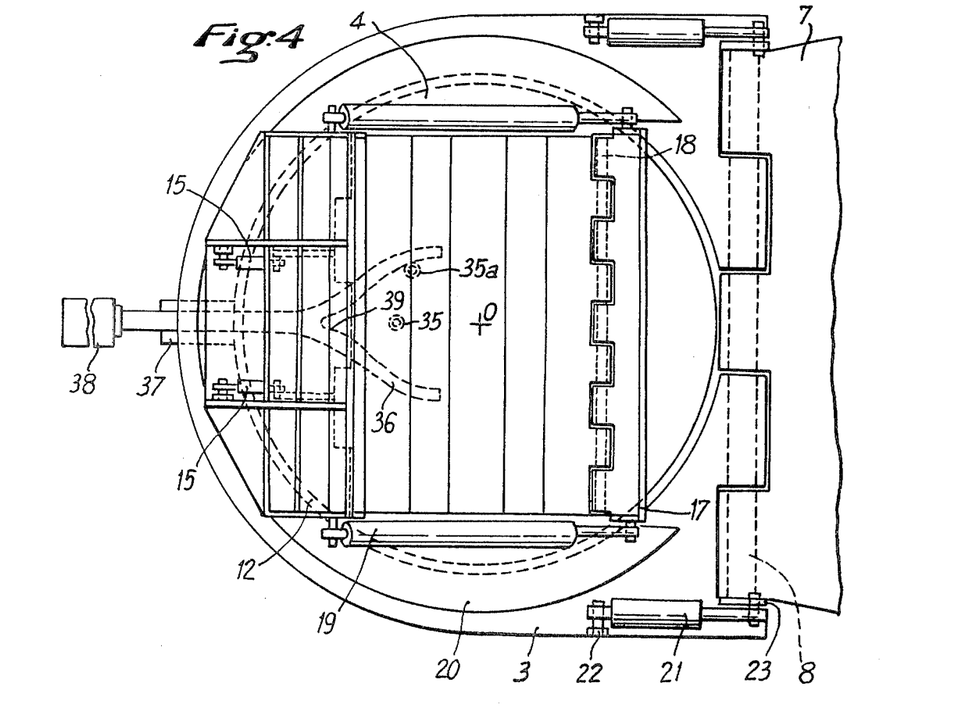
FIG. 4 is a plan view of the embodiment of FIG. 3.
Figure 5:
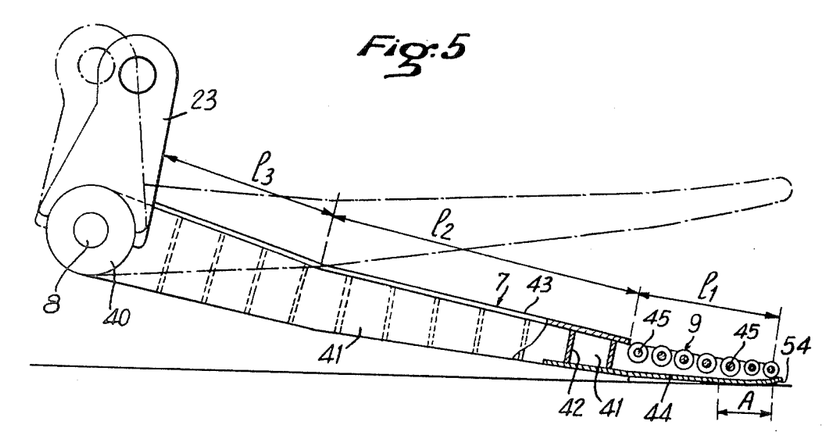
FIG. 5 is a longitudinal cross-section of a preferential embodiment of the access ramp.
Figure 6:
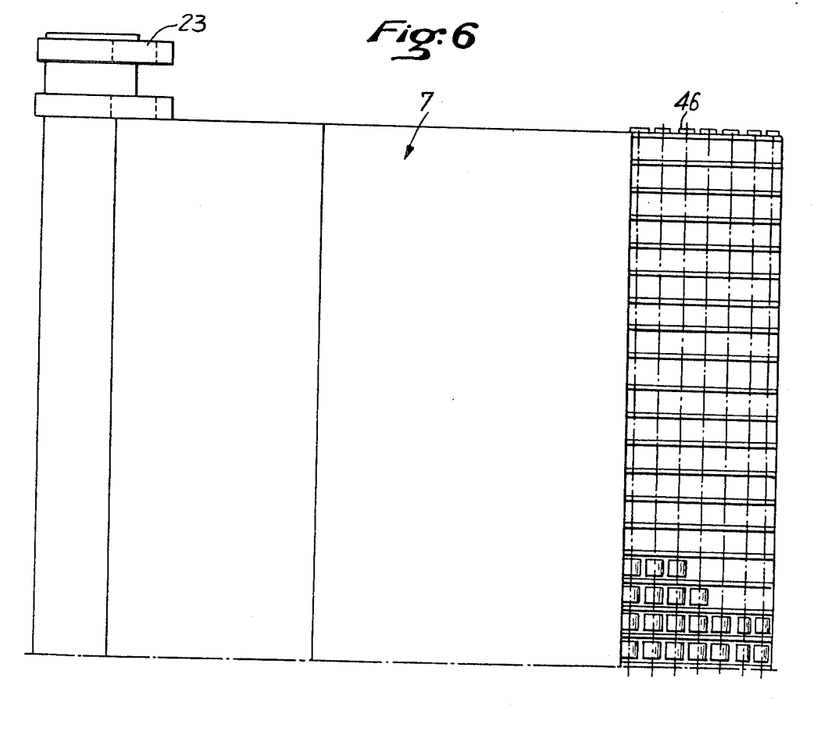
FIG. 6 is a half plan view of said ramp.

An embodiment of the rear platform 3 of the airport towing vehicle 1 will now be described, with reference to FIGS. 3 and 4 where the same reference numerals already used in FIGS. 1 and 2 are applied to the similar elements. On said rear platform 3 is rotatably mounted through rollers 11 a turntable 4 which assumes in its middle portion a cylindrical concave shape for receiving and locking in position the nose wheel unit 5 of the large transport aircraft. The turntable 4 carries a stop device for the nose wheel unit which comprises a fixed front upper plate 12 and a front lower plate 13 capable of pivoting about an axis 14. The inclination of plate 13 and its longitudinal position can thereby be modified as a function of the type of aircraft to handle due to stays 15 one of the ends of which 15' is fixed and the other end 15" can be secured tp various holes 16 of the reinforcement ribs of plate 13. Moreover, the locking device comprises a plate forming a retractable rear stop means 17 pivotally mounted about an axis 18 onto plate 4. The rotation of said plate 17 is controlled by jacks 19 articulated at their other end on the stays supporting the fixed front upper plate 12. For loading the aircraft, the retractable plate 17 is folded over onto the turntable, and when the nose wheel unit 5 of the aircraft is abutting against the front plate 13, the rear plate 17 is raised, thereby locking in position the nose wheel unit 5. In order to free the nose wheel unit 5 and thereby let the aircraft come down from the rear platform, the rear plate 17 has only to be brought back to its retracted position. Moreover, in order that the aircraft may be disengaged from the towing vehicle in the case of an accidental obstacle or of a jamming where there is a risk that the nose unit strut will be torn away, or even at the will of the aircraft pilot when he blocks his brakes, the jacks 19 controlling the raising of plate 17 are of the hydro-pneumatic type and their pressure may be adjusted as a function of the type and weight of the aircraft.

On the other hand, and as hereabove mentioned, the rear platform 3 is extending via an inclined plane forming an access ramp 7. Said access ramp is fixed onto platform 3 via a transverse axis 8 about which it can pivot, whereby the raising of the access ramp can be effected by any appropriate device such as jacks 21 operative between the frame 22 of platform 3 and the end of a crank 23 fixedly connected to access ramp 7.

As hereabove explained, at the beginning of the engagement and as is shown in the drawings, the tires of the nose wheel unit 5 bear on the ground and the rollers 9 lift the nose wheel unit under which they roll until the unit is lifted from the ground and is able to run on the plane of the access ramp.

The load P of the nose wheel unit (FIG. 1) is of the order of several tens of tons and this load which may reach 45 tons is progressively transferred by rollers 9 onto the end of the access ramp 7. If the end A of the access ramp is brought in contact with the tire by being even slightly lifted from the ground, the transfer of the weight on the access ramp provides an extra crushing of the rear wheel tires, whereby the lower part of the ramp 7 comes in contact with the ground with a pressure which may reach several tens of tons, and due to the high frictional coefficient between said part of the inclined plane and the coating of the runway, the resisting force F opposed to the reversing of the towing vehicle reaches a few tens of tons and is in any case far superior to the useful component for lifting the nose wheel unit which is equal to $P \times \sin\alpha$. Said force F applied to axis 8 is decomposed into a horizontal force T which determines the resisting torque and a vertical component R which unloads the rear wheels 2 which will thereby have a reduced adherence at the moment where the torque necessary on the driving wheels will be maximum.

According to a characteristic of the invention, the value of force F is reduced by reducing the bearing force of the inclined plane on the ground. The jacks 21 are supplied from a fluid source under pressure which is not shown via a piping 24 (FIG. 1), the supplied chamber of the single action jacks 21 is that which corresponds to the lifting of the access ramp 7. This supply is controlled by an electro-valve 25 the opening, closing and exhaust positions of which are controlled by an electric cable 26 from the piloting cabin. The hydraulic motors 27 of wheels 2 are powered from a pump which is not shown via a high pressure piping 28 with oil return via a piping 29.

According to an embodiment in principle, an intercommunication piping 30 controlled by an electro-valve 31 is connected between pipings 24 and 28. When the engagement edge of the access ramp 7 is engaged under the wheel 5 of the nose unit, the driver controls via an electrical circuit 32 the opening of the electro-valve 31 which comprises a calibrated valve such that it opens only when a minimum pressure prevails in piping 28. At this moment, the high pressure of the motors which is a function of the efforts at the wheels is applied in the chamber of jacks 21, which exert a force tending to lift the access ramp and thereby to lift the nose wheel unit by partially compensating force P. This part of the load absorbed by the jacks 21 is transferred on the rear wheels of the towing vehicle whose adherence is thereby increased.

In order to provide automatic re-alignment and eventual locking in said re-alignment position of the turntable 4, it is possible to foresee under said turntable an eccentric lug which, in the present case, is a roller shown at 35 in its alignment position and at 35a in the position which it is likely to assume in the maximum disalignment position. There exist many mechanical possibilities for bringing the lug from its position 35a back to its position 35 and for, eventually, blocking it in said position. According to the illustrated embodiment, this is achieved by a cam 36 which is fork-shaped and movable along the longitudinal axis of the towing vehicle by being guided by a guide 37, its movement being controlled by a jack 38. The arms of the fork have a shape such that they meet roller 35a in all the disalignment positions which may in practice be encountered and exert on the latter a force which tends to bias it back towards the axis. In its centre, the fork is formed with an axial notch 39 for engagement around roller 35 and for locking turntable 4 in rotation. When the only operation is to re-align the turntable, the jack 38 is operated and then brought back to its idle position. If on the contrary the turntable has to be locked in position, the pressure is maintained in jack 38 for the whole duration of the operation.

In the preferential embodiment shown in FIGS. 5 through 8, the access ramp is made of a plurality of hubs 40 rotatably mounted on axis 8 and carrying a series of longitudinal flanges 41 braced together by transverse flanges 42 so as to make a grid-shaped beam. As an example worked out with figures, the access ramp has a width of 2.20 meters and a length from axis 8 of 1.50 meter. According to this preferential embodiment, the upper surface of the inclined plane forms three plane transverse portions 11, 12 and 13, said portions forming with each other dihedrons which, in the longitudinal plane, are equal to 176° between 11 and 12, and 174° between 12 and 13 respectively. The respective lengths of portions 11, 12 and 13 are respectively approximately equal to 30 centimeters, 70 centimeters and 50 centimeters. The end portion A of the lower surface of the beam is substantially plane and forms with surfaces 11, 12 and 13 respectively angles of 8°, 12°and 18°. On lengths 12 and 13, the upper surface of the access ramp is made of a metal sheet 43 and under the end of the lower surface of the beam is welded a manganese steel sheet 44 the free end of which is turned upwards at 54. In the ends non covered by sheet 43, that is in portions 11 of said flanges 41, the distance between centre lines of which is about 60 millimeters, are drilled seven series of bores in alignment for the passage of axes 45 kept in position by stop rings 46. On said axes having a diameter of 20 millimeters are rotatably mounted, between the flanges, the rollers 9. The two pluralities of rollers which are nearest to the free edge 54 have preferably a diameter of say 30 millimeters and the five following series have a diameter of 50 millimeters, the centering of axes 45 being such that the upper generating lines of the rollers 8 are in the plane of 11. The reason for the reduced diameter of the the two first series of rollers is to reduce the height of the platform edge which forms the engagement edge under the tires of the nose wheel unit.

The operation of the hereabove access ramp will now be described with reference to FIGS. 7 and 8 when loading a large transport aircraft whose load P1 of the nose wheel unit is maximum 36 tons. The coefficient of friction of the tires on the runway cement which is variable according to the state of the ground is assumed to be 0.9, and the wheels of the nose unit of the aircraft being braked, the engagement force which would have to be applied on the periphery of the wheels of the nose unit in order to bring them in rotation would be higher than 32 tons. The coefficient of friction of a tire on a steel sheet is of about 0.7. At the moment of the engagement of an inclined plane the upper surface of which is made of a metal sheet under the wheels, and taking in account only the friction of said metal sheet against the tires, the force to be overcome would then be equal to 70% about of the part of the load P1 transferred at each moment to the inclined plane until said sliding frictional force of the tires on the plate of the inclined plane is in excess of the frictional force of the bearing surface of the tires on the ground; moment at which the wheels would start running. This moment would correspond with the hereabove values when transferred to the inclined plane of about 9/16 that is 56% of the load P1, that is in the case under consideration of about 20.25 tons. From this moment, the nose wheel unit would run on the inclined plane and the load P3 transferred by the inclined plane to the ground would be of 36 tons. Such a load cannot be transferred by rollers rolling on the runway ground, since the load per square centimeter would result in punching the cement, the rollers being per force of reduced diameter in order to be accommodated sufficiently near the inclined plane edge. It is therefore necessary to transfer the load applied on the inclined plane to the runway cement through a bearing shoe. The coefficient of friction of the metallic shoe on the runway cement being of 0.5, the frictional component F3 of the access ramp shoe on the ground in the engagement force to apply to bring the nose wheel unit upwards on the ramp would then be in excess of 7.75 tons and reach 18 tons at the moment of complete loading. One can see that immediately before the wheel of the nose unit starts rotating, there is a friction of the fixed surface of the ramp on the tire and a friction of the ramp shoe on the ground, and the engagement force to be exerted by the towing vehicle would be of $20.25 \times (0.5 + 0.7) = 24.3$ tons, a force to which should be added a component corresponding to the running on an inclined plane which is equal to the slope angle sine which is of 0.26 with an access ramp slant of 15°, this being the minimum angle which can be reached in practice. Such a component corresponding to the load of 36 tons would represent 9.5 tons. It would be impossible to engage such an access ramp under the nose wheel unit of the aircraft under consideration since the engagement force would be in excess of 34 tons and would remain at about 28 tons once the nose wheel unit would be engaged for running on the ramp.

The substitution of rollers 9 to a fixed surface at the end of the ramp reduces in a very high proportion the coefficient of friction of the tires on the ramp upper surface, and practically cancels it. The wheels of the nose unit of the aircraft start then to turn only when the almost total load is transferred on the end of the access ramp. The frictional force of the supporting shoe on the ground will correspond to about $0.5 \times 36 = 18$ tons to which will have to be added about $0.26 \times 35 = 9.5$ tons proportional to the slant angle sine. The engagement force is therefore reduced by about 6 tons but is still then too high, all the more so that it unloads the rear wheels of the towing vehicle.

Figure 7:
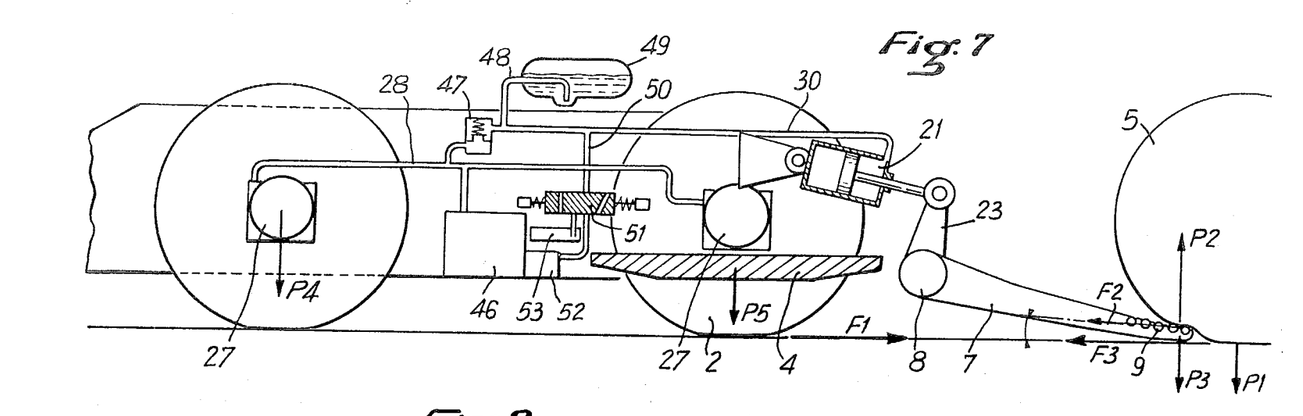
FIG. 7 is a side schematic elevation of the ramp during the first phase of the loading operation.
Figure 8:
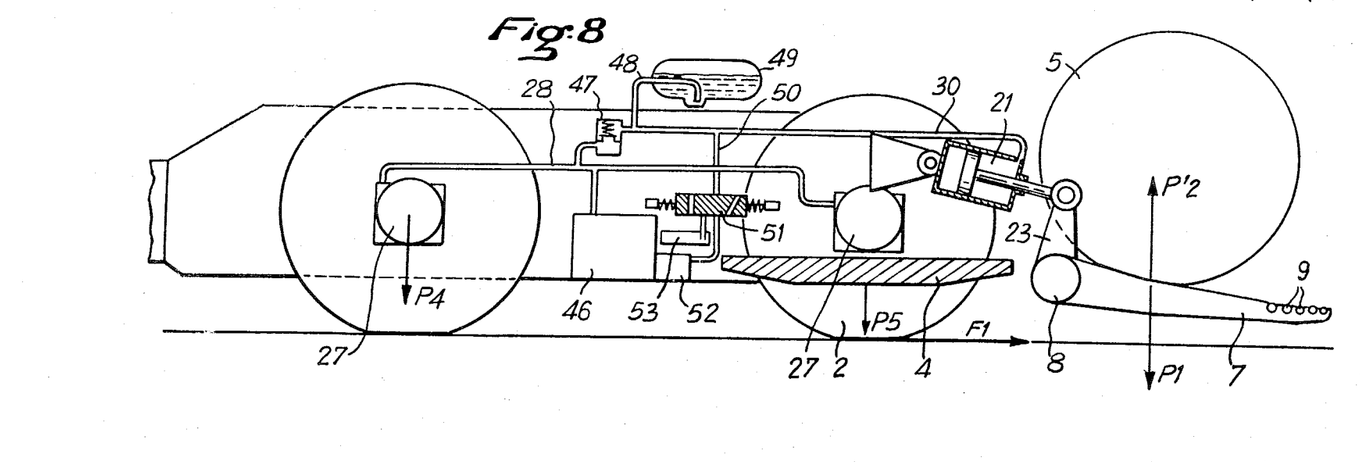
FIG. 8 is a schematic view corresponding to FIG. 7 during a subsequent phase of the loading operation.

According to a preferential embodiment shown in FIGS. 7 and 8, a pressure is made to apply in jacks 21 which is proportional to the load transferred to the end of the ramp, in fact the supply pressure for the hydraulic motors driving the towing vehicle wheels, in such manner that as the frictional force of the shoe, that is of sheet A, on the ground increases, the lifting torque exerted by jacks 21 increases in such manner as to reduce the friction on the runway of the shoe formed by portion A of sheet 44. The lifting torque however has to be controlled so that the lifting force P2 exerted by the ramp on the nose wheel unit be always inferior to the portion of P1 which is transferred to the end of the ramp. Moreover, said condition has to be checked even with aircraft having a front wheel unit less loaded.

Consequently, in the embodiment shown in FIGS. 7 and 8, the jacks 21 are supplied from piping 28 which, from pump 46 which is driven by a motor not shown, supplies the hydraulic motors 27 of the front and rear wheels via piping 30. On piping 30 is mounted a valve 47 which is in practice calibrated at 150 bars (about 150 ) kg/cm$^2$). Moreover, a piping 48 which emerges in an accumulator 49 is connected to piping 30. Finally, piping 30 has a by-pass piping 50 which, through a slide-valve 51, can be set in communication with pump 52 supplying the servo-devices under a pressure of say 150 bars, or with an exhaust tank 53.

In use, the slide valve 51 is controlled for connecting piping 50–30 with pump 52. The jacks 21 are supplied at about 150 bars, which lifts the access ramp 7 to bring it in abutment against end of lifting stroke stop members which are not shown. When the towing vehicle is in alignment with the aircraft to be loaded, valve 51 is operated to connect piping 50–30 with the exhaust. The ramp 7 engages then the ground by the portion A of plate 44 under the action of its own weight. The valve 51 is then set on the dead-point. The towing vehicle reverses then for engaging the end of the ramp under the wheel or wheels 5 of the nose unit of the aircraft. Due to rollers 9, the force which the towing vehicle has to overcome through the thrust F1 has a frictional component F3 equal to about 0.50 of P3 (the fraction of P1 transferred to the ground via the metal sheet 44) and a component proportional to the sine of angle α. As a larger fraction of P1 is transferred to the ground by metal sheet 44, F3 and therefore F1 increase and the feed pressure of the hydraulic motors 27 which is proportional to F1 increases also. As soon as the feed pressure of the motors is in excess of 150 bars, valve 47 opens and the extra pressure is directed to jacks 21. In practice, the cross-section of jacks 21 is such, taking into account the ratio of the length of ramp 7 to the length of the lever arm 23, that for an operational pressure of 550 bars providing a pressure in jacks 21 of 400 bars, the lifting force P2 exerted by the ramp on the wheel of the nose unit is of about 16 tons. It can be seen that under these conditions, the load P3 of the ramp on the ground is of 20 tons, providing a pushing component F3 corresponding to the friction of the ramp on the ground of about 10 tons. The potential thrust of the towing vehicle for a high pressure of 550 bars being of 20 tons, there remains available a force of 10 tons for engaging the wheel on the inclined plane, which gives an angle α theoretically defined by 36 sin α = 10, that is an angle α of 16°. With an angle α of 12°, the rolling component on the inclined plane is of 7.5 tons, which leaves an acceptable margin. It will be understood that if F1 is lower than 20 tons, the feed pressure will be lower than 550 bars and P2 will decrease, which will increase F3. A balanced operational pressure is thereby established.

As the loading progresses, the wheels of the nose unit bearing on the end of the ramp and moving upwards along said ramp, the point of application P2 grows nearer to axis 8 and P2 increases in a manner which is inversely proportional to the distance since the pressure in jacks 21 is maintained by valve 47 being closed, the pressure being stored in accumulator 49.

If one considers the access ramp such as described hereabove with reference to FIGS. 1 and 2 on the portion 11, angle α is of 8° and the rolling force is theoretically of 5 tons. The frictional force is equal to (36−P2)×0.5 and the feed pressure Pe of the motors is equal in bars to Pe = 550×(36−P2)×0.5+5/20 and P2 is itself equal to (16×(Pe−150)/400, which gives Pe=462 bars; P2=12.48 tons; F1=16.75 tons, F3=11.76 tons.

When the application point of the load of the nose wheel unit is at the junction point of 11 and 12, the lever arm of P2 is reduced from 1.50 meter to 1.20 meter and P2 has become P'2 equal to 12.48×1.5/1.2=15.6 tons; the difference which is 20.4 tons being distributed in the proportion of 4.08 on axis 8 and 16.32 on the supporting shoe. The ramp does not rise from the ground but component F3 of the friction is reduced to 8.16 tons. At this point, angle α becomes equal to 12° and the rolling component becomes equal to 36×sin 12°=7.48 tons, that is F1=15.64 tons.

The access ramp will start lifting from the ground when P2=36 tons, that is when the bearing point of the nose wheel unit will be at 0.52 meter, that is substantially at the junction point between 12 and 13. The slant of the ramp is then equal to 18° but P3 and consequently F3 reach zero. The result is that F1=F2 is equal to 36 sin 18°=11.12 tons and F1 has of course decreased progressively while the nose wheel unit was running along the length of 12 due to the reduction of F3, F2 remaining constant.

From this moment, the access ramp moves progressively upwards as explained hereabove and F2 and therefore F1 decrease towards zero, which is theoretically reached when the nose wheel unit reaches a point perpendicular to axis 8.

The hereabove explanation is theoretical and has not taken in consideration the resistance of the towing vehicle when running and of the nose unit which of course increase F1. However, it is interesting to point out that the value of F2 which is a force applied on the strut of the nose wheel unit of the aircraft is limited in practice to the load × sin 12°, or 20% of the load.

When, while being towed, the pilot applies the brakes to the main landing gear of the aircraft, the nose wheel unit leaves platform 4 due to the calibration of the stop members and engages when reaching axis 8 the access ramp 7. The access ramp moves down, said movement being however damped by jacks 21 which are kept connected with accumulator 49. During said movement, force F2 pushes the towing vehicle whereas force F3 brakes it. The values of said two hereabove mentioned forces for the loading operation show that the towing vehicle will be pushed in a progressively increasing mode with F2 over length 13, then, over length 12, F2 will remain equal to 7.48 tons whereas the braking force will pass from 0 to 8.16 tons so that the towing vehicle is then slightly braked, then the braking force becomes predominant untill it reaches the value of 6 tons. The coming down of the nose wheel unit from the access ramp is performed while the towing vehicle is being braked and is therefore less brutal. This feature may justify to keep a frictional component F3 which is slightly superior to component F2.

What is claimed is:

1. A towing vehicle capable of handling a wheel of an aircraft comprising: a movable chassis having a platform thereon, an access ramp pivotally connected at one end to an edge of the platform, the lower surface of the access ramp defining a sliding shoe for contacting and sliding along the ground, and at least one row of rollers mounted on said ramp and arranged offset from and parallel with the end of the access ramp opposite to said pivotally connected end such that the rollers protrude above the upper surface of the access ramp, the rollers positioned above the lower surface of the access ramp such that the aircraft wheel can move over the rollers onto the upper surface of the platform and only the sliding shoe portion of the ramp is capable of contacting the ground.

2. A vehicle according to claim 1 having at least two weeks for moving the chassis further comprising a horizontal turntable rotatably mounted on the platform to receive the nose wheel unit of an aircraft substantially between the at least two wheels.

3. A vehicle according to claim 1, further comprising hydraulic lifting means for raising an opposite end of the access ramp, hydraulic motor means for driving the chassis, a source of pressurized fluid, means for supplying the fluid to said motor and lifting means and means for operating the lifting means to produce a lifting force on the opposite end of the access ramp which is a function of the contact force between the lower surface of the access ramp and the ground, said operating means comprising pressure reducing valve means for supplying the lifting means at a pressure which is a predetermined amount less than the pressure supplied to the motor means.

4. The vehicle according to claim 3 wherein the operating means provides a lifting force which is less than the contact force.

5. A vehicle according to claim 3 further comprising non-return valve means supplying the lifting means and accumulator means downstream of the valve means communicating with the lifting means.

6. A towing vehicle capable of handling the nose wheel unit of aircraft comprising: a movable chassis having a platform thereon, an access ramp pivotally connected at one end to an edge of the platform, lifting means for raising the opposite end of the access ramp, a horizontal turntable rotatably mounted on the platform, retractable jaw means for engaging the nose wheel unit on the turntable, resilient means for biasing the jaw means to engage the nose wheel unit, said biasing means capable of disengaging the nose wheel unit upon application of a tractive force greater than a predetermined force and servo-control means for locking the biasing means in engaged position to prevent disengagement of the nose wheel unit upon rotation of the turntable beyond a predetermined position.

7. A vehicle capable of handling aircraft comprising: a movable chassis having a platform thereon, an access ramp whose lower surface defines a sliding shoe capable of contacting and sliding along the ground, said ramp pivotally connected at one end to an edge of the platform, hydraulic lifting means for raising the opposite end of the access ramp from the ground, hydraulic motor means for driving the chassis, a source of pressurized fluid, means for supplying the fluid to said motor and lifting means, and servo-control means for operating the lifting means to produce a lifting force on the opposite end of the access ramp which is a function of the contact force between the lower surface of the access ramp and the ground, said operating means comprising pressure reducing valve means for supplying the lifting means at a pressure which is a predetermined amount less than the pressure supplied to the motor means.

8. A vehicle according to claim 7 wherein the operating means provides a lifting force which is less than the contact force.

9. A vehicle according to claim 6 wherein the lifting means comprises hydraulic jack means acting between the chassis and the access ramp.

10. A vehicle according to claim 6 wherein the biasing means comprises hydraulic jack means capable of releasing the jaw means upon application of a predetermined force.

11. A vehicle according to claim 6 wherein the angle of incline of the access ramp increases from said opposite end of the ramp to said one end.

12. A vehicle according to claim 6 having at least two connected wheels for moving the chassis, said horizontal turntable positioned substantially between the at least two wheels.

* * * * *